United States Patent
Sirpal et al.

(10) Patent No.: US 10,382,371 B2
(45) Date of Patent: Aug. 13, 2019

(54) SYSTEM AND METHODS FOR CARD INTERACTION AND ASSIGNING CARDS TO DEVICES

(71) Applicants: Jamdeo Canada Ltd., Oakville (CA); Qingdao Hisense Electronics Co., Ltd., Qingdao, Shandong (CN); Hisense USA CORP., Suwanee, GA (US); Hisense International Co., Ltd., Qingdao (CN)

(72) Inventors: Sanjiv Sirpal, Oakville (CA); Mohammed Selim, Oakville (CA); Alexander De Paz, Burlington (CA); Salvador Soto, Toronto (CA); Sergii Grysenko, Burlington (CA)

(73) Assignee: Qingdao Hisense Electronics Co., Ltd., Qingdao (CN)

( * ) Notice: Subject to any disclaimer, the term of this patent is extended or adjusted under 35 U.S.C. 154(b) by 554 days.

(21) Appl. No.: 14/829,923

(22) Filed: Aug. 19, 2015

(65) Prior Publication Data
US 2016/0231880 A1    Aug. 11, 2016

Related U.S. Application Data

(60) Provisional application No. 62/113,225, filed on Feb. 6, 2015.

(51) Int. Cl.
*G06F 3/01* (2006.01)
*G06F 3/14* (2006.01)
(Continued)

(52) U.S. Cl.
CPC ............ *H04L 51/046* (2013.01); *G06F 3/017* (2013.01); *G06F 3/0481* (2013.01);
(Continued)

(58) Field of Classification Search
CPC .... G06F 3/0486; G06F 3/0482; G06F 3/1454; G06F 9/4445; G06F 3/04817;
(Continued)

(56) References Cited

U.S. PATENT DOCUMENTS 5,726,883 A * 3/1998 Levine .................... G06F 3/033 700/83
8,966,375 B2 * 2/2015 Wasko .................. G06F 3/0482 715/740

(Continued)

*Primary Examiner* — Andrew L Tank
(74) *Attorney, Agent, or Firm* — Gordon & Rees LLP

(57) ABSTRACT

The present disclosure relates to systems, methods and devices for the presentation of a user interface and operation of devices. In one embodiment, a method for assigning card elements of an application user interface to a device includes presenting a user interface, wherein the user interface is presented including graphical elements for one or more card elements, and wherein the user interface is presented including graphical elements for one or more devices. The method also includes detecting a user interface command to associate a selected card element presented by the user interface with a selected device presented by the user interface and outputting a communication including an association of the selected card element with the selected device. Another embodiment is directed to a device configured to run an application and configured for assigning card elements to other devices.

21 Claims, 9 Drawing Sheets

(51) Int. Cl.

| | |
|---|---|
| *G09G 5/00* | (2006.01) |
| *H04L 12/24* | (2006.01) |
| *H04L 12/28* | (2006.01) |
| *H04L 12/58* | (2006.01) |
| *H04L 29/08* | (2006.01) |
| *H04N 21/45* | (2011.01) |
| *H04N 21/81* | (2011.01) |
| *G06F 3/0481* | (2013.01) |
| *G06F 3/0482* | (2013.01) |
| *G06F 3/0484* | (2013.01) |
| *G06F 3/0485* | (2013.01) |
| *G06F 3/0488* | (2013.01) |
| *H04N 21/426* | (2011.01) |
| *H04N 21/442* | (2011.01) |
| *H04N 21/458* | (2011.01) |
| *H04N 21/482* | (2011.01) |
| *H04N 21/488* | (2011.01) |
| *H04N 21/4402* | (2011.01) |

(52) U.S. Cl.
CPC .......... *G06F 3/0482* (2013.01); *G06F 3/0485* (2013.01); *G06F 3/04817* (2013.01); *G06F 3/04842* (2013.01); *G06F 3/04845* (2013.01); *G06F 3/04847* (2013.01); *G06F 3/04883* (2013.01); *G06F 3/1415* (2013.01); *G09G 5/005* (2013.01); *H04L 12/2807* (2013.01); *H04L 41/0806* (2013.01); *H04L 41/12* (2013.01); *H04L 41/22* (2013.01); *H04L 67/303* (2013.01); *H04L 67/306* (2013.01); *H04N 21/42653* (2013.01); *H04N 21/4402* (2013.01); *H04N 21/44227* (2013.01); *H04N 21/458* (2013.01); *H04N 21/4516* (2013.01); *H04N 21/4826* (2013.01); *H04N 21/4882* (2013.01); *H04N 21/812* (2013.01); *G09G 2354/00* (2013.01)

(58) Field of Classification Search
CPC ............ G06F 3/04886; G08C 2201/30; G08C 2201/90; G08C 2201/92; G08C 2201/93; H04N 21/4224; H04M 1/72533; H04L 12/2816; H04L 12/282
See application file for complete search history.

(56) References Cited

U.S. PATENT DOCUMENTS

| | | | | |
|---|---|---|---|---|
| 9,137,389 | B2* | 9/2015 | Neal | G06Q 10/103 |
| 9,471,287 | B2* | 10/2016 | Rempell | H04L 51/046 |
| 2007/0082707 | A1* | 4/2007 | Flynt | G06F 3/0481 |
| | | | | 455/564 |
| 2007/0101297 | A1* | 5/2007 | Forstall | G06F 3/04817 |
| | | | | 715/841 |
| 2010/0138763 | A1* | 6/2010 | Kim | G06F 1/1626 |
| | | | | 715/765 |
| 2010/0333008 | A1* | 12/2010 | Taylor | G06F 3/0486 |
| | | | | 715/769 |
| 2011/0047187 | A1* | 2/2011 | Sinha | G06F 9/543 |
| | | | | 707/802 |
| 2012/0151418 | A1* | 6/2012 | Conzola | G06F 17/30637 |
| | | | | 715/853 |
| 2013/0057587 | A1* | 3/2013 | Leonard | G06F 3/0488 |
| | | | | 345/660 |
| 2013/0174223 | A1* | 7/2013 | Dykeman | G06F 21/10 |
| | | | | 726/4 |
| 2013/0268810 | A1* | 10/2013 | Prasad | G06F 11/0751 |
| | | | | 714/48 |
| 2014/0020068 | A1* | 1/2014 | Desai | H04L 63/10 |
| | | | | 726/4 |
| 2014/0032722 | A1* | 1/2014 | Snow | G06F 9/4445 |
| | | | | 709/220 |
| 2015/0011311 | A1* | 1/2015 | Relan | A63F 13/355 |
| | | | | 463/31 |
| 2016/0246490 | A1* | 8/2016 | Cabral | G06F 9/4443 |
| 2016/0345050 | A1* | 11/2016 | Hirabayashi | H04H 20/91 |

* cited by examiner

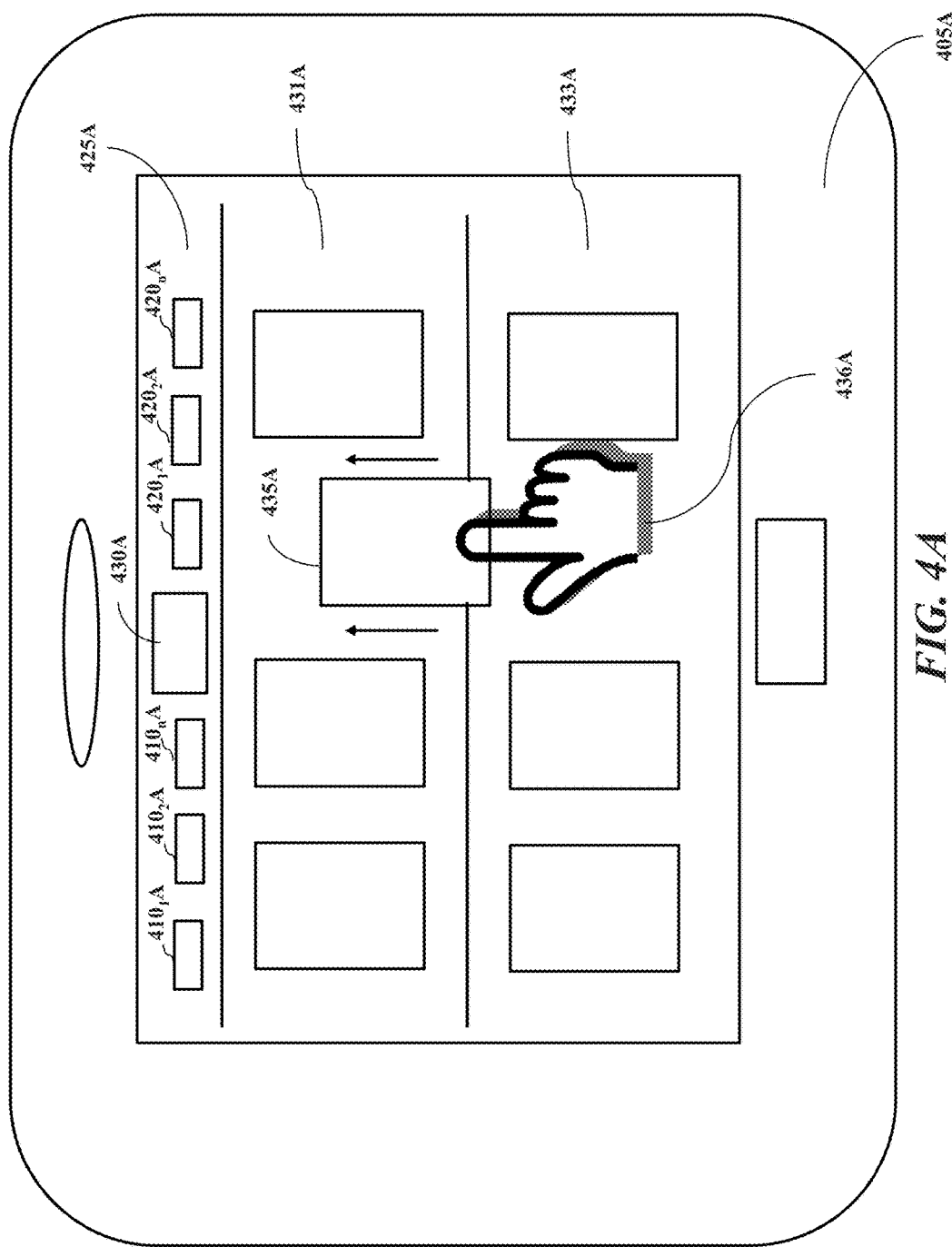

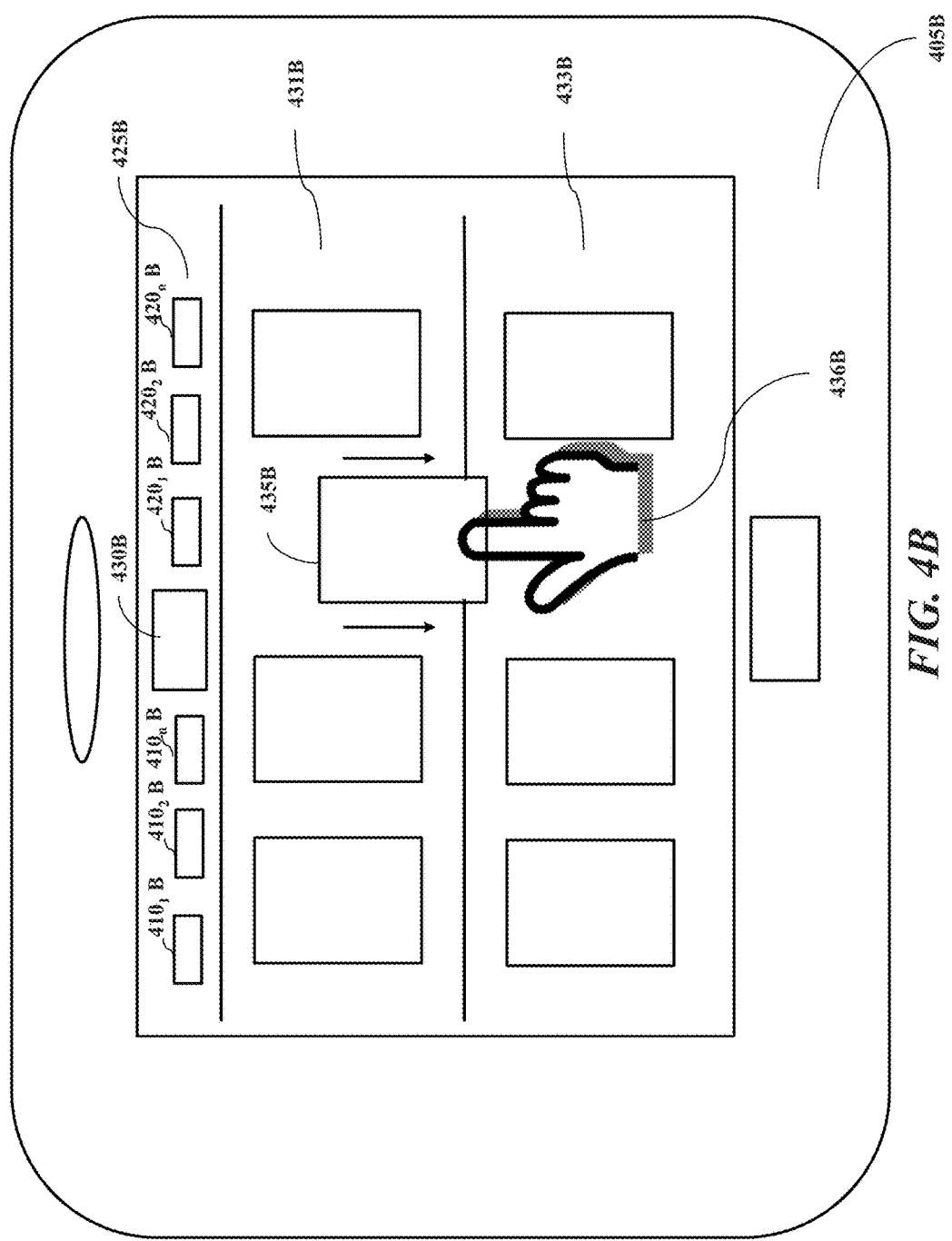

SYSTEM AND METHODS FOR CARD INTERACTION AND ASSIGNING CARDS TO DEVICES

CROSS-REFERENCE TO RELATED APPLICATIONS

This application claims priority to U.S. Provisional Application No. 62/113,225 titled SYSTEM AND METHODS FOR AN APPLICATION CONFIGURATION AND PRESENTATION filed on Feb. 6, 2015, the content of which is expressly incorporated by reference in its entirety.

This application is related to the concurrently filed applications entitled: SYSTEM AND METHODS FOR APPLICATION USER INTERFACE PRESENTATION AND CARD ELEMENTS filed on Aug. 19, 2015 and assigned patent application Ser. No. 14/829,886; SYSTEM AND METHODS FOR CARD ELEMENT APPLICATION OPERATION filed on Aug. 19, 2015 and assigned patent application Ser. No. 14/829,893; SYSTEM AND METHODS FOR CARD EXCHANGE AND USER INTERFACE PRESENTATION filed on Aug. 19, 2015 and assigned patent application Ser. No. 14/829,904; SYSTEM AND METHODS FOR CONTROL OF CARD ELEMENTS WITHIN AN APPLICATION USER INTERFACE filed on Aug. 19, 2015 and assigned patent application Ser. No. 14/829,914; SYSTEM AND METHODS FOR CARD INTERACTION AND ASSIGNING CARDS TO SPACES filed on Aug. 19, 2015 and assigned patent application Ser. No. 14/829,930; SYSTEMS AND METHODS FOR CONNECT TO CONTROL filed on Aug. 19, 2015 and assigned patent application Ser. No. 14/829,942; SYSTEMS AND METHODS FOR DEVICE TO DEVICE CONTROL filed on Aug. 19, 2015 and assigned patent application Ser. No. 14/829,955; SYSTEM AND METHODS FOR SETTINGS CARDS filed on Aug. 19, 2015 and assigned patent application Ser. No. 14/829,970; and SYSTEM AND METHODS FOR PRESENTATION OF A USER INTERFACE AND CARD ELEMENTS filed on Aug. 19, 2015 and assigned patent application Ser. No. 14/829,986, the disclosures of which are expressly incorporated by reference.

FIELD

The present disclosure relates to electronic devices and applications, and more particularly to methods and devices configured for exchange and communication for card elements and devices.

BACKGROUND

Technologies associated with network devices, and in particular personal devices, are implemented in various forms and accessible from many sources. Services for mobile communication can allow for portability of devices. While conventional systems allow for mobility, there are limitations on devices and device configurations. With respect to local networks, system components are also limited in many ways. Many conventional devices are not interoperable with other devices or network services. Connectivity of devices, or the lack connectivity, in conventional systems can be a major drawback. Many user devices must be configured to interact with one another. In many cases, conventional communication protocols and configurations do not allow for connectivity.

BRIEF SUMMARY OF THE EMBODIMENTS

Disclosed and claimed herein are systems, methods and devices for assigning a card element to a device. One embodiment is directed to a method for assigning card elements of an application user interface to a device including presenting, by a device, a user interface, wherein the user interface is presented including graphical elements for one or more card elements, and wherein the user interface is presented including graphical elements for one or more devices, and detecting, by the device, a user interface command to associate a selected card element presented by the user interface with a selected device presented by the user interface. The method also includes outputting, by the device, a communication including an association of the selected card element with the selected device, wherein the association of the selected card with the selected device includes updating metadata for the card element.

In one embodiment, the user interface includes the graphical elements for one or more devices in a first portion of the user interface and graphical elements for the one or more cards elements in a second portion of the user interface.

In one embodiment, each card element includes graphical display elements in the user interface configured to be manipulated within the user interface to allow for at least one of exchange of data, capabilities, and device control.

In one embodiment, the user interface command includes selection and movement of a graphical element for the selected card from a first position in user interface to a second position associated with display of the selected device.

In one embodiment, the one or more devices refer to devices associated with the device by the application.

In one embodiment, the one or more devices include virtual device profiles.

In one embodiment, association of the card element includes transmission of card element metadata to the device.

In one embodiment, updating metadata includes storing a unique identifier of the device with the card element metadata.

In one embodiment, the method includes determining that assignment of the selected card element to the selected device conforms to at least one of capabilities of the device and card element constraints.

In one embodiment, the user interface continues to display the selected card element in the user interface following assignment to the selected device.

Another embodiment is directed to a device including a display configured to present a user interface and a controller coupled to the display. The controller is configured to present a user interface, wherein the user interface is presented including graphical elements for one or more card elements, and wherein the user interface is presented including graphical elements for one or more devices and detect a user interface command to associate a selected card element presented by the user interface with a selected device presented by the user interface. The controller is also configured to output a communication including an association of the selected card element with the selected device, wherein the association of the selected card with the selected device includes updating metadata for the card element.

Another embodiment is directed to a system including a server and a device configured to communicate with the server. The device is configured to present a user interface including graphical elements for one or more card elements, and wherein the user interface is presented including graphical elements for one or more devices, and detecting a user interface command to associate a selected card element presented by the user interface with a selected device presented by the user interface. The device is also configured to outputting a communication to the server including an association of the selected card element with the selected device, wherein the association of the selected card with the selected device includes updating metadata for the card element.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIG. 4A depicts a graphical representation of card interaction within a user interface according to one or more embodiments;

FIG. 4B depicts card interaction within the secondary user interface according to one or more embodiments;

DETAILED DESCRIPTION OF THE EXEMPLARY EMBODIMENTS

Overview and Terminology

Figure 1A:
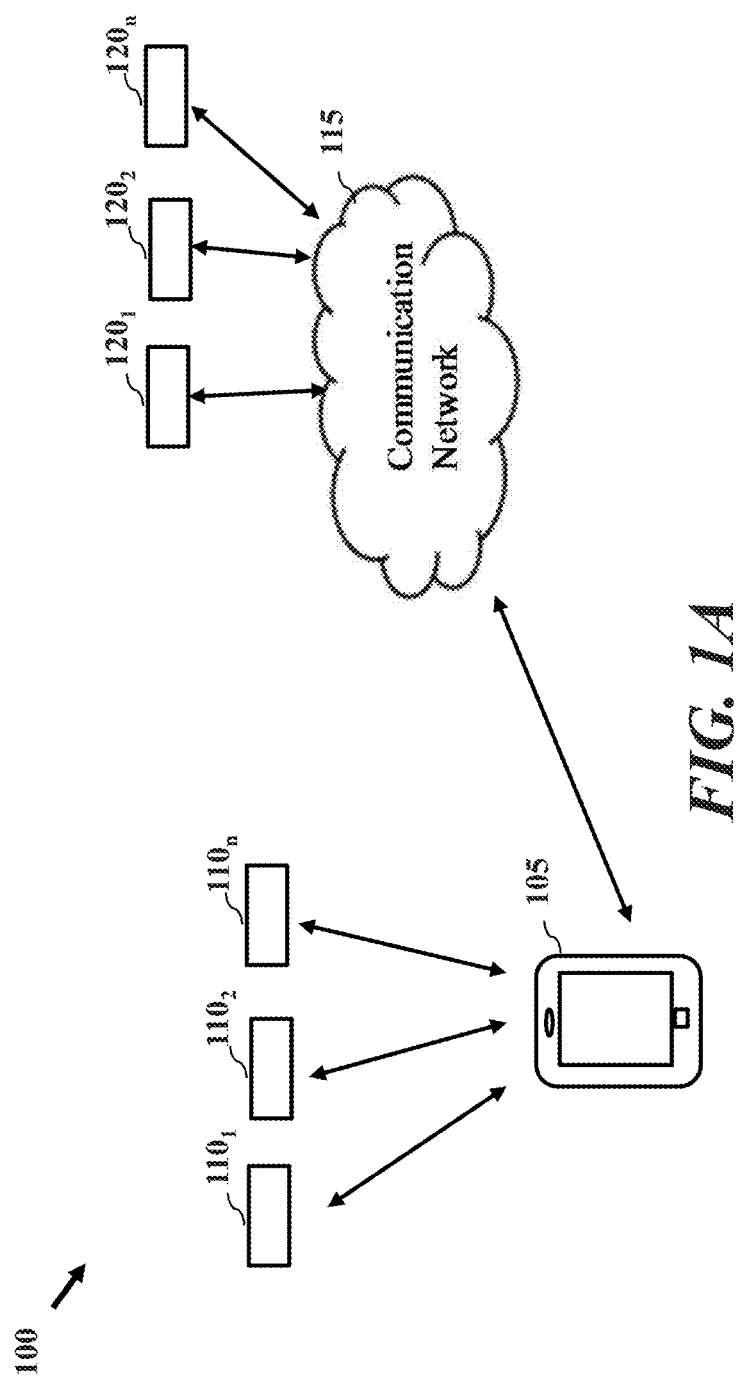
FIG. 1A depicts a graphical representation of a simplified system diagram according to one or more embodiments.

One aspect of the disclosure is to provide methods and devices for card interaction and assigning cards to devices. In one embodiment, a mobile operating system/experience (MOX) application is provided for card interaction and assigning cards. In another embodiment, a device is disclosed for facilitating card interaction and assigning cards. In another embodiment, a system is provided for allowing card assignment to devices. Other embodiments are directed to presentation of a user interface and processes for method is disclosed for creating the cards for use in the MOX application.

One or more embodiments described herein are directed to communication with devices and interoperability of devices by way of an application configured to execute on the one or more devices. The application, which may be a MOX application, may be configured to present a user interface with graphical elements to represent entities (e.g., devices, spaces, etc.) and card elements. The user interface may also be configured to allow for manipulation of the card elements, such that assignment of a card to a device within the user interfaces results in an association of a card element to the device within the application. In that fashion, representations in the user interface can result in associations of data by devices running the application (e.g., MOX application).

Another embodiment is directed to hanging cards on an application entity. According to one embodiment, hanging a card on a device, or application entity, relates to an association of a card element with a particular application entity for a temporal or permanent association. Hanging a card on an entity, allows for other entities or users associated with the application to view and/or access the hanged card element.

As used herein, a card can relate to graphical elements displayed in a user interface, wherein each card element can allow for one or more of exchange, communication, control and/or application accessibility. Card elements may be associated with one or more types of cards and one or more types of capabilities. A card element may have a data structure associated with each card type, the card providing metadata that can allow an application and/or devices to utilize the card. According to one embodiment, each card element can include a graphical element that is represented by a device and/or can include a data record stored by one or more servers or devices that allow for the card to be shared, transmitted, loaned, exchanged, associated, pulled and/or pushed to one or more devices and spaces. Card elements may define capabilities of devices and/or spaces. Card elements may be associated with devices or spaces that are real or virtual. Card elements may be uniquely identified.

As used herein, a MOX application relates to an application having particular core elements that allow for the application to be executed across many different devices and devices types. The application may be platform agnostic and thus, configurable on one or more operating systems or platform types (e.g., linux, etc.). The MOX application provides connectivity, control and/or communication relative to one or more devices. The MOX application can be operated based on communication with a network and/or pear-to-pear communication among devices. The MOX application may operate within a network or system that is an ecosystem or MOX ecosystem. The MOX application may be deployed on one or more devices, entities or spaces that make up a MOX ecosystem.

According to one embodiment, the MOX system is an application that runs on a mobile device. According to another embodiment, MOX provides a unique user interface with many features. Features of the MOX application can be characterized as user interface (e.g., user experience) features and architectural features. The MOX system incorporates cards. Cards are displayed as visual elements in the user interface that can be manipulated to provide exchange of data, capabilities, and allow for device control. Card elements may be configured as containers.

As used herein, an entity relates to elements that that are recognized and that make up an ecosystem of the application. An entity may relate to a device, space, and users of an application. An ecosystem relates to collections of entities that are associated.

Spaces relate to real and virtual locations that are recognized by the application. By way of example, a space may be assigned to one or more of a room, building, floor, home, office or other physical location (e.g., café, office, etc.). Spaces may also be assigned to virtual locations that do not have a corresponding physical location.

A device can relate to devices configured to execute and run a MOX application. A device can also relate to non-MOX devices. Devices may refer to real and virtual devices.

Architectural aspects of the MOX application relate to the card configuration, platform for operating with mobile device OS, and underlying processes for card exchange functionality.

One embodiment is directed to processes for presentation of a user interface and a device configured to present a user interface, such as MOX, with cards.

Another embodiment is directed to an application platform, processes and devices for operating within a MOX platform. MOX may provide a common UI for multiplatform devices, such as a single unified way to control or know even though devices are not connected. The MOX architecture may include one or more of the following attributes: use of cards as containers, defined card architecture, card based metadata (Json Metadata). MOX may allow for spaces and provide a visual of all spaces based on connection. MOX may include a prioritization algorithm based on proximity, known/history, places with access, etc. MOX may allow for a search of virtual spaces. MOX may be configured with a MOX stack and MOX plugin, and security features. MOX may allow the same card to provide different actions on different devices. May be configured to publish card into any device (virtual or real).

MOX may operate based on independently defined APIs, which are available via a RESTful interface (similar to the cloud interface). The APIs may be defined by an OEM to support the device.

In certain embodiments, a MOX card itself is an HTML object, containing relevant resources related to color pallet, and branding, as well as the interactive components. Both the front and the back of the card are supplied by the device itself, and are validated by the cloud.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Referring now to the figures, FIG. 1A depicts a graphical representation of a simplified system diagram according to one or more embodiments. System 100 may be configured for presentation of an application by device 105. By way of example, system 100 includes one or more devices that may be configured with similar core elements to allow for an application to reside on one or more devices for connectivity, communication, exchange and/or control relative to the devices. Based on the application, device 105 may communicate and interoperate with one or more other devices, such as devices $110_{1-n}$. According to another embodiment, device 105 may communicate and interoperate with one or more other devices, such as devices $120_{1-n}$ by way of a communication network 115. System 100 may be configured to allow for control and communication by device 105 with one or more of devices $110_{1-n}$.

Device 105 may be configured to execute an application, such as a MOX application providing one or more functions, including but not limited to viewing of cards associated with the user device, viewing other devices and cards associated with other devices, exchange of cards between the user device-exchange may be based on one or more of push/fling, pull and exchange of cards and contextual presentation of cards. The user interface may be configured to detect user commands of device 105 for assignment of cards to another device, such as devices $110_{1-n}$ and/or $120_{1-n}$.

According to one embodiment, device 105 is configured to run an application (e.g., a MOX application) configured to present a user interface. Device 105 includes memory and hardware configured to store and execute and application, such as a MOX application and to operate with one or more card elements. The MOX application may run across multiple devices of system 100, including multiple device types and across multiple device operating platforms.

According to one embodiment, devices $110_{1-n}$ relate to one or more devices in close proximity to device 105. Device 105 may be configured to communicate wirelessly with the devices $110_{1-n}$ by way of the MOX application. Devices $110_{1-n}$ relate to devices associated with a particular space and/or ecosystem. Accordingly, a user interface may identify and/or include graphical elements for devices $110_{1-n}$ and for card elements of devices $110_{1-n}$. Devices $120_{1-n}$ relate to devices which may be communicated with over communication network 115 via the user interface of the MOX application. Devices $120_{1-n}$ may relate to devices in close proximity or distances from device 105. Devices $120_{1-n}$ may relate to electronic devices. In some embodiments, devices $120_{1-n}$ include one or more servers.

Device 105 may run a MOX application that allows for detection of user input/touch command of a graphical element and movement from one section of the display to another section where the graphical element is a card element, and how the system processes the movement (exchange, interact, control, etc.). Movement of cards within the user interface call allow for assignment of a card to a device.

The MOX application can allow for one or more of card presentation, association of cards and entities (e.g., devices, virtual devices), transition of card and/or entities with respect to user actions or spaces, display of cards based on capability matching, selection of which cards to display, user and device avatars, a summary view and detailed view of card, and card comments.

Device 105 may present/provide a user interface and MOX application to allow for hanging cards on devices, controlling devices using cards, borrowing services (e.g., Wi-Fi) using cards, capability sharing (e.g., sharing control of a device), and one or more features built around sharing cards. Device 105 may detect user input/touch commands of a graphical element and movement from one section of the display to another section where the graphical element is a card element. The MOX application processes movement of cards (exchange, interact, control, etc.).

Device 105 includes a display configured to present a user interface and a controller coupled to the display. The controller is configured to present a user interface. An exemplary representation of a user interface is depicted in FIG. 3 according to one or more embodiments. The user interface is presented including graphical elements for one or more card elements, graphical elements for one or more spaces and devices, such as devices $110_{1-n}$ and devices $120_{1-n}$.

Architectural aspects of the MOX application can include providing card configurations, providing a platform for operating with mobile device operating systems (OS), and underlying processes for card exchange functionality within the MOX application.

Device 105 may be a mobile device or tablet executing an application, such as the MOX application executed by device 105. Although FIG. 1 depicts one device 105, it should be appreciated that system 100 and the application may allow for multiple devices to communicate and interoperate.

System 100 may include a server, wherein one or more of devices 120$_{1-n}$ may relate to servers. Device 105 may be configured to communicate with the server of system 100. The device is configured to present a user interface including graphical elements for one or more card elements, detect a user interface command to associate a selected card element presented by the user interface with a selected space presented by the user interface, and output a communication to the server including an association of the selected card element with the selected space, wherein the association of the selected card with the selected space includes updating metadata for the card element.

Figure 1B:
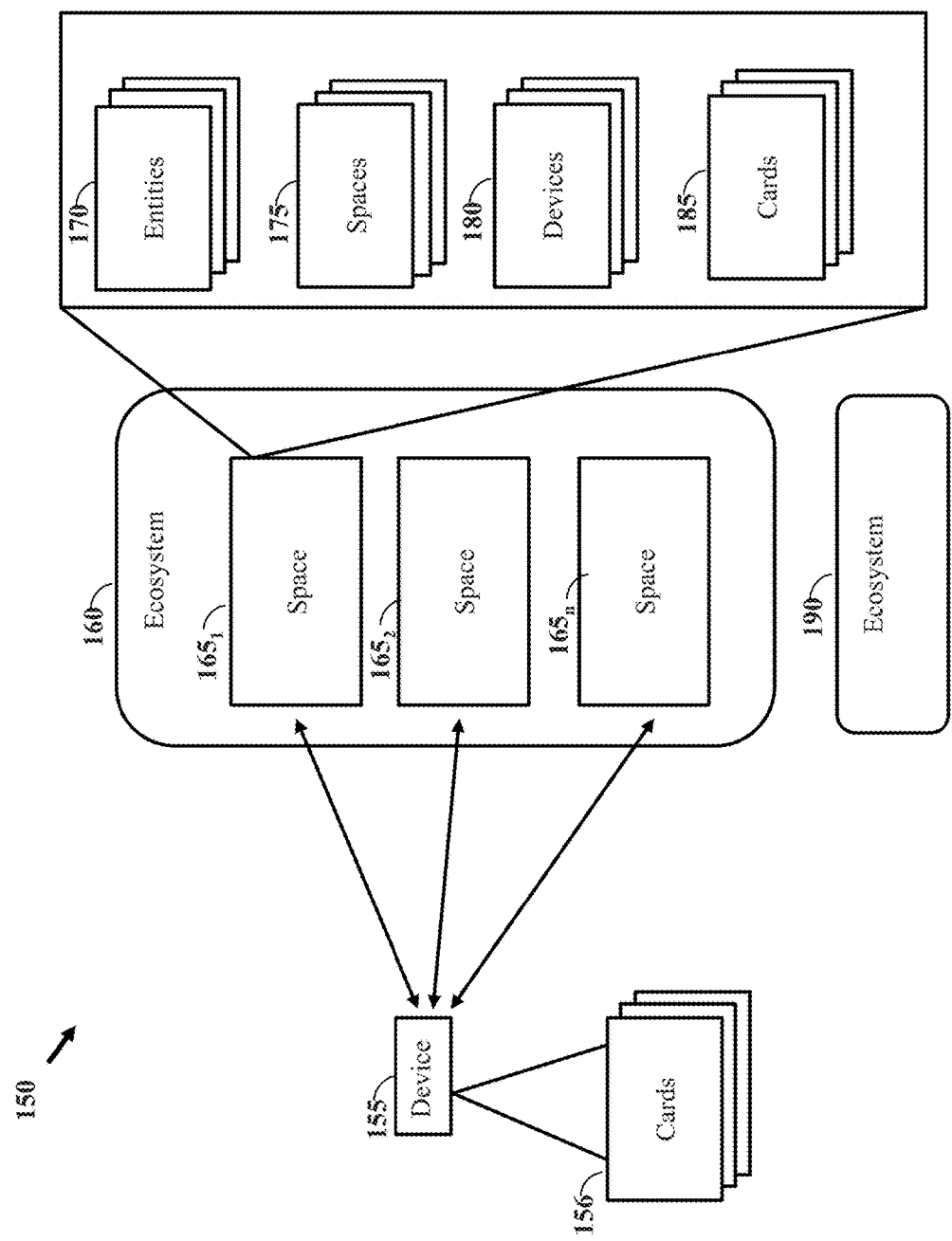
FIG. 1B depicts a graphical representation of system entities according to one or more embodiments.

FIG. 1B depicts a graphical representation of system entities according to one or more embodiments. According to one or more embodiments, an application or electronic platform is provided for communication, control and exchange based on one or more associations. FIG. 1B depicts a graphical representation of application entities for a MOX application system. A MOX system 150 can include a plurality of devices, such as device 155. System 150 depicts an exemplary representation of entities that can make up ecosystem of the application with respect to device 155. Device 155 may relate to a representation of device 105 of FIG. 1A.

Each device in system 150 can be associated with one or more ecosystems. Device 155 is associated with ecosystem 160. Within a MOX system, each device may be associated with different ecosystems. Ecosystems may be particular to a particular device or user. Ecosystem includes a plurality of spaces 165$_{1-n}$. According to one embodiment, each of spaces 165$_{1-n}$ may be associated with device 155 by user selection, location of device 155 and/or by system 150. A user interface of device 155 may display graphical elements associated with one or more of spaces 165$_{1-n}$ based on the location and/or operation of the device. Spaces 165$_{1-n}$ may be real or virtual locations. By way of example, spaces 165$_{1-n}$ may be assigned to one or more of a room, building, floor, home, office or other physical location (e.g., café, office, etc.). Spaces 165$_{1-n}$ may also be assigned to virtual locations that do not have a corresponding physical location. Each of spaces 165$_{1-n}$ may be associated with one or more devices, such as device 155 for a user. Based the selection of a space or location of device 155, the user interface may present one or more graphical elements for each space. In addition, device 155 may be configured to assign one or more cards to a device.

Card elements 156 are HTML objects, containing relevant resources related to color pallet, and branding, as well as the interactive components. Both the front and the back of the card are supplied by the device itself, and are validated by the cloud.

Each of spaces 165$_{1-n}$ may include and/or be associated with a plurality of entities 170, spaces 175, devices 180, and cards 185. Entities 170 associated with a space, such as space 165$_1$, can include MOX and non-MOX enabled devices, users, etc. Spaces 175 associated with a space, such as space 165$_1$, can include one or more spaces associated based on location, card selection, user preferences/selections, etc. Devices 180 associated with a space, such as space 165$_1$, can include MOX and non-MOX enabled devices, devices based on location, device assigned to a space etc. Cards 185 associated with a space, such as space 165$_1$, can include one or more card elements associated by a user to a space, such as cards 156 or cards that may be available while within a space. According to one embodiment, device 155 may be configured to detect an input command to a user interface for the application and assign a card to at least one space, such as spaces 165$_{1-n}$, and/or one or more devices, such as devices 180.

Ecosystem 190 may be another ecosystem that is not assigned to device 155. Device 155 may be configured to join or gain access to ecosystem 190 using a MOX application.

Figures 2A, 2B:
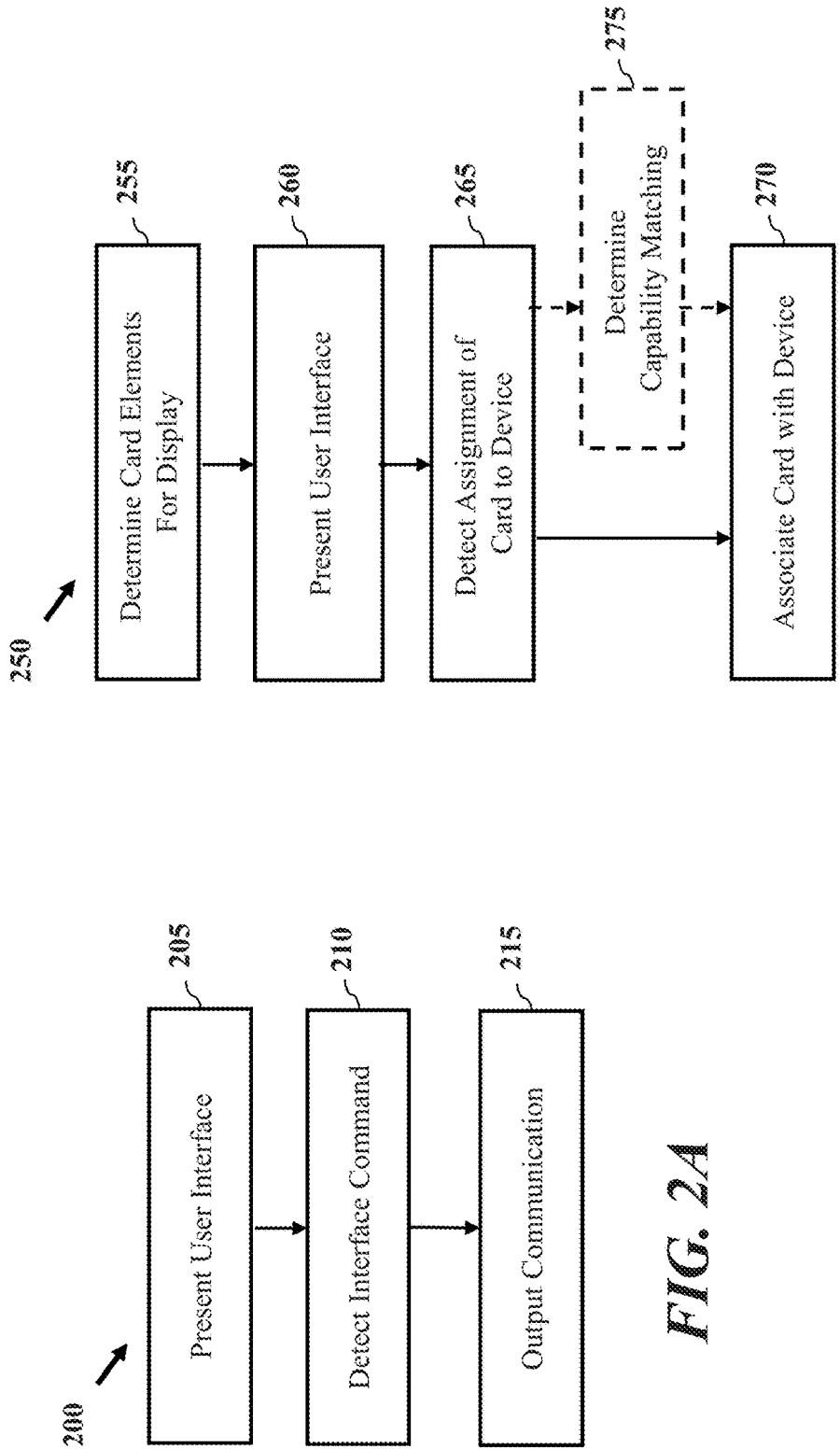
FIGS. 2A-2B processes for assigning card elements of an application user interface to a device according to one or more embodiments.

FIGS. 2A-2B depict processes for assigning card elements of an application user interface to a device according to one or more embodiments. FIG. 2A depicts process 200 for presentation of a user interface according to one or more embodiments. Process 200 may be employed to for assigning card elements of an application user interface to a device or devices. Process 200 may be performed by a device such as device 105 of FIG. 1A. Process 200 may be configured to present a user interface at block 205. The user interface presented at block 205 may be associated with a MOX application. The user interface may be presented at block 205 including graphical elements for one or more card elements, graphical elements for one or more spaces, and graphical elements for one or more devices. In one embodiment, the user interface includes graphical elements for one or more devices in one portion of the user interface and the graphical elements for one or more card elements in a second portion of the user interface. For example, the devices may be icons or graphical elements presented in a top portion of the user interface. Each card element includes graphical display elements in the user interface configured to be manipulated within the user interface to allow for at least one of exchange of data, capabilities, and device control.

At block 210, an interface command is detected. The detected interface command may be to associate a selected card element presented by the user interface with a selected device presented by the user interface. In certain embodiments, the user interface command includes selection (e.g., tap, tactile, other, etc.) and movement of a graphical element for the selected card from a first position (e.g., the displayed position) in user interface to a second position associated with display of the selected device. The selected device may refer to physical or virtual locations.

At block 215, the application outputs a communication based on the detected interface command. According to one embodiment, outputting a communication includes the association of the selected card element with the selected device. Based on the association of the selected card with the selected device, metadata for the card element may be updated. Association may include transmission of card element metadata to the device. In one embodiment, updating metadata includes storing a unique identifier of the device with the card element metadata.

In one embodiment, assignment of the selected card element to the selected device may be based on a determination that the card element can be assigned to the device. For example, the application can determine whether the assignment conforms to at least one of capabilities of the device and card element constraints. The card application may determine that a card element cannot be assigned to a device and in response may display one or more elements to indicate that the assignment cannot be made. Following the output communication at block 215, user interface can continue to display the selected card element in the user interface following assignment to the selected device.

In one embodiment, process allows for exchange of data associated with the card to be provided to a device. The MOX application may be configured to allow for the data to be usable by one or other MOX devices. In this fashion, conventional methods of electronically sending that require end user addresses (e.g., email) are not required. Similarly, assignment does not require configuration, downloading, decompressing, other steps for the card to be useable once assigned. Rather, card assignment allows for the card element to appear within the user interface when the device to which the card is assigned is selected. In addition, one or more properties of the card element may be usable by the device to which the card is assigned. According to one embodiment, outputting a communication at block 215 includes hanging a card to a space by the application.

FIG. 2B depicts a process for operation of a device (e.g., device 105) according to one or more embodiments. Process 250 may be configured to run an application (e.g., a MOX application) to determine card elements for display at block 255. At block 260, the application presents a user interface with graphical card elements associated with a MOX application. At block 265, the application can detect assignment of a card to a device. Process 250 may continue with associate the card with the device at block 270. Process 250 may optionally include determining the capability matching of the card element and the device at block 270.

Figure 3A:
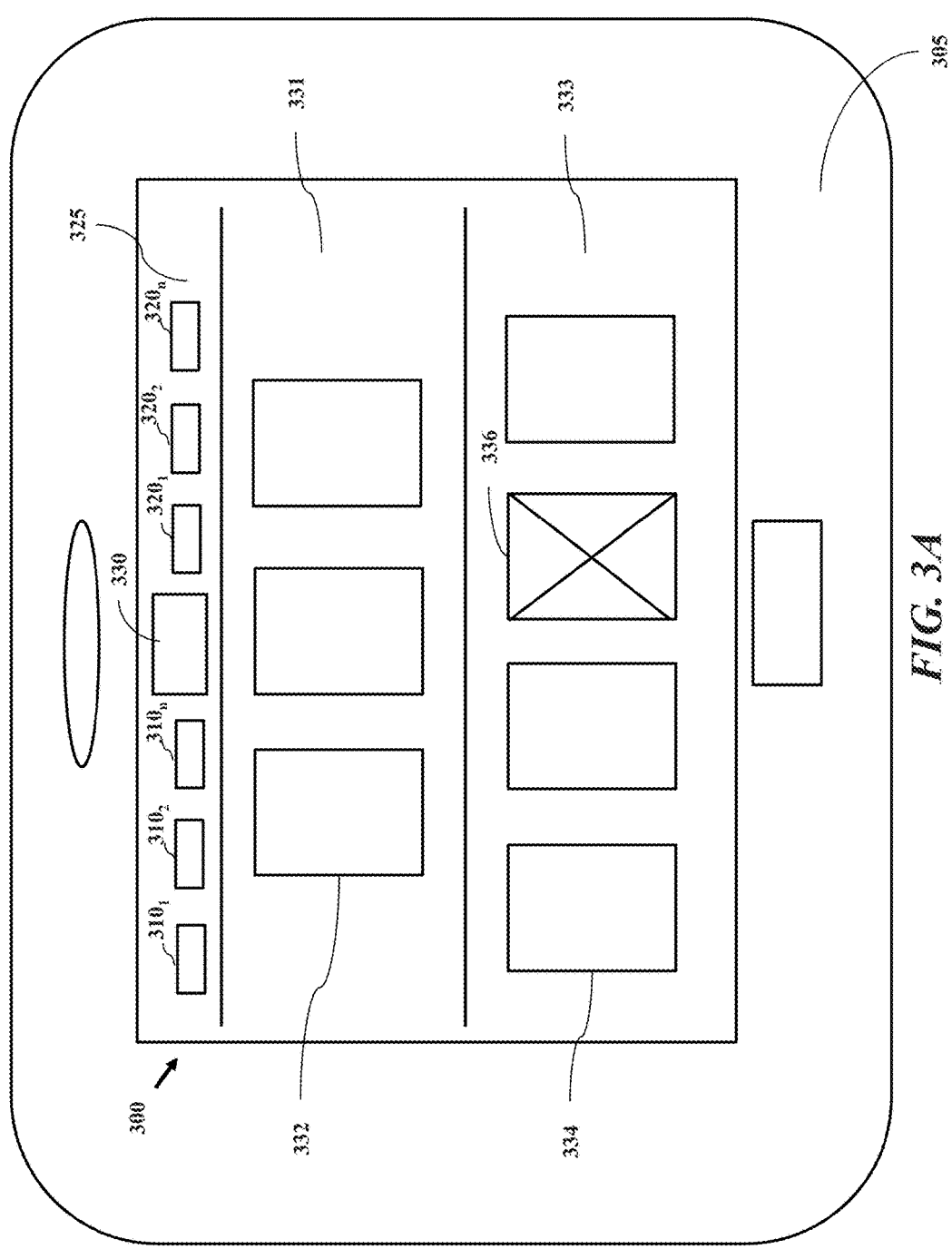
FIGS. 3A-3B depict a graphical representations of a user interface according to one or more embodiments.
Figure 3B:
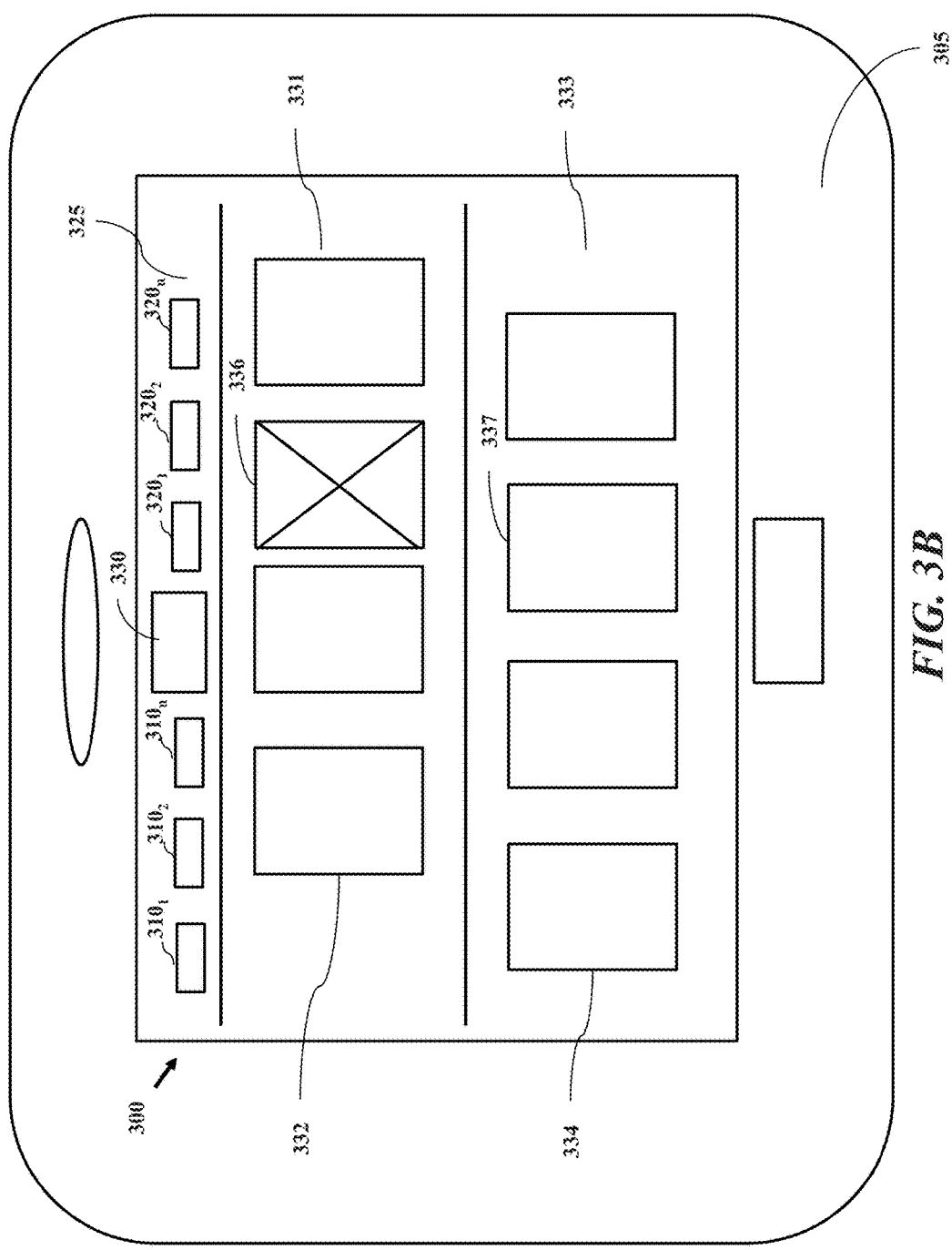

FIGS. 3A-3B depict graphical representations of a user interface according to one or more embodiments. The user interface may be displayed on a user device 305. The user device 305 can be a cellular phone, an electronic tablet, an e-reader, a laptop computer, or any other device with control capabilities and a connection to a communication network. The user interface 300 is presented including graphical elements for one or more card elements including graphical elements for one or more spaces. Features of user interface 300 allow for one or more of viewing of cards associated with the user device, viewing other devices and cards associated with other entities (e.g., other devices, spaces), and exchange of cards between the user device and other devices. Exchange may be based on one or more of push/fling, pull and exchange of cards. The user interface also allows for contextual presentation of cards.

In one embodiment, user interface 300 may provide card interaction by way of an exchange view. A MOX application may provide processes and device for exchange of a card via a user interface (MOX). User interface features and processes for showing cards include a detailed view and summary view when selected, capability matching, communication of device features, devices indicating that services and capabilities are available, and associating content with any device so that content appears to reside on the device.

In one embodiment, MOX may provide card interaction including a push operation. The push operation may include one or more of a fling gesture of card, a profile card, settings card, cards in general, etc., hanging a card, capabilities (network access, temporary control of a device, guest features, etc.) capability matching, appearance of card transition.

In one embodiment, MOX may provide card interaction including a pull operation. The pull operation may include one or more of pulling a device card, borrowing capabilities, capability matching, pulling settings vs. pulling an app., pulling a card off of a device, appearance of card transition.

In one embodiment, MOX may provide card interaction including Assigning/associating cards to devices (virtual or connected). The operation may include one or more of a device that is connected or not is presented in the MOX UI and connection to the device (whether virtual or actual) based on card, processes for identification based on scanning, and searching for non-connected and connected devices, associating devices (connected or not with spaces), and creating a virtual equivalent.

In one embodiment, MOX may provide card interaction including Assigning cards to Space/Card Hanging. The operation may include one or more of processes and device where a card may be assigned to a space, including acts for flinging, pushing or hanging card to a space, presentation of the card on other devices, presenting cards based on a space that a device is in, card presentation based on geolocation.

One embodiment is directed to detection of user input/touch command of a graphical element and movement from one section of the display to another section where the graphical element is a card element. The MOX application processes movement of cards (exchange, interact, control, etc.). The application allows for description of card presentation, description of cards and entities (e.g., devices, virtual devices) in user interface, transition of card and/or entities with respect to user actions or spaces, display of cards based on capability matching, selection of which cards to display, user and device avatars, design summary view and detailed view of card, and card comments.

User interface features allow the MOX application to provide functions including hanging cards on devices, controlling devices using cards, borrowing services (e.g., Wi-Fi) using cards, capability sharing (e.g., sharing control of a device), and one or more features built around sharing cards.

In FIG. 3A, user interface 300 of the user device 305 has a number of individual features, such as a user row 333 and a device row 331. The user interface also presents an entity list 325. The entity list includes a listing of a plurality of devices or spaces, shown as $310_1$, $310_2$, $310_n$, 330, $320_1$, $320_2$, and $320_n$. In this embodiment, there is no limit to the number of entities in the entity list 325. Some of the entities $310_1$, $310_2$, $310_n$, are connected directly with the user device 305. Some of the entities $320_1$, $320_2$, and $320_n$, are connected to the user device 305 by a communication network. The communication network can be a local network or a more global network, such as the Internet.

The user interface of the user device 305 also presents a plurality of user card elements 334 which are stored on the user row 333. These user card elements 334 are associated with the user device 305. Likewise, the user interface of the user device 305 presents a plurality of device card elements 332 which are stored on the device row 331. These device card elements 332 are associated with a selected third-party device 330. The selected third-party device is one of the plurality of third-party devices which are listed on the entity list 325. The user has the ability to select any third-party device, $310_1$, $310_2$, $310_n$, 330, $320_1$, $320_2$, and $320_n$, and upon selection, the user's choice will become the selected third-party device 330. Once the user has made a choice for the selected third-party device 330, the device row 331 will automatically update such that the device row 331 displays the plurality of device card elements 332 associated with the selected third-party device 330.

According to one embodiment, user interface 300 is presented including graphical elements 334 for one or more card elements in a first portion (e.g., row 333) and graphical elements for one or more devices $310_{1-n}$ and $320_{1-n}$. User inputs (e.g., contact, touch, selection, etc.) may be detected by device 305 as a user interface command to associate a selected card element presented by the user interface with a selected device presented by the user interface 300. FIG. 3A depicts a selected card 336 in a first portion of the user interface. In certain embodiments, the user selection may be a tap, hold and drag to a second portion of the user interface, such as device row 331. The second portion of the user interface may also relate to a tap, hold, and drag to a device (e.g., one or more devices $310_{1-n}$ and $320_{1-n}$). Following the assignment of the card to a device, user interface 300 may update the presentation format.

FIG. 3B depicts a selected card 336 in a portion of the user interface following card assignment to a device according to an exemplary embodiment. According to one embodiment, selected card element may be assigned to another device, and thus, the application will present a graphical element for the selected card element 336 in row 331. In certain embodiments, assignment of a card element to a device copies the card element to the device, such that a graphical element, such as 337, is still provided in row 333 of the user interface. In other embodiments, assignment of for the selected card element 336 will transfer the selected card element to the device for which graphical elements in row 331 are presented. In such a case, user interface will present graphical element 337 in row 333 which relates to a different card element from selected card element 336. Device 305 may output a communication including an association of the selected card element 336 with the selected device, wherein the association of the selected card with the selected device includes updating metadata for the card element.

FIG. 4A depicts a graphical representation of card interaction within a user interface according to one or more embodiments. The user interface is displayed on the user device 405A. The user interface presents a user row 433A and a device row 431A. The user interface also presents an entity list 425A. The entity list includes a listing of a plurality of devices/spaces $410_1A$, $410_2A$, $410_nA$, 430A, $420_1A$, $420_2A$, and $420_nA$. In this embodiment, there is no limit to the number of entities in the entity list 425A. Some of the entities $410_1A$, $410_2A$, $410_nA$, are connected directly with the user device 405A. Some of the entities $420_1A$, $420_2A$, and $420_nA$, are connected to the user device 405A by a communication network. The communication network can be a local network or a more global network, such as the Internet.

The user has the ability to select any entity $410_1A$, $410_2A$, $410_nA$, 430A, $420_1A$, $420_2A$, and $420_nA$, and upon selection, the user's choice will become the selected entity 430A. Once the user has made a choice for the entity 430A, the device row 431A will automatically update such that the device row 431A displays the plurality of card elements associated with the selected entity 430A.

The user device 405A allows for the user to send a selected card element 435A from the user row 433A to the entity 431A. The user does this through a tactile motion 436A. The tactile motion 436A can be one continuous swipe, flick, fling, or similar gesture. Alternatively, the tactile motion 436A can be a plurality of tapping motions.

According to one embodiment, tactile motion 436A relates to assignment of a card from user row 433A to device row 431A which may be associated with a particular space. Accordingly, the application can detect user interaction within a user interface presented by device 405A to assign a card to a space and/or hang a card to a space.

FIG. 4B depicts card interaction within the secondary user interface according to one or more embodiments. The secondary user interface is displayed on the secondary user device 405B. The secondary user interface presents a user row 433B and a device row 431B. The secondary user interface also presents an entity list 425B. The entity list includes a listing of a plurality of entities $410_1B$, $410_2B$, $410_nB$, 430B, $420_1B$, $420_2B$, and $420_nB$. In this embodiment, there is no limit to the number of entities listed in the entity list 425B. Some of the entities $410_1B$, $410_2B$, $410_nB$, are connected directly with the secondary user device 405B. Some of the entities $420_1B$, $420_2B$, and $420_nB$, are connected to the secondary user device 405B by a communication network. The communication network can be a local network or a more global network, such as the Internet.

The secondary user has the ability to select any entity $410_1B$, $410_2B$, $410_nB$, 430B, $420_1B$, $420_2B$, and $420_nB$, and upon selection, the secondary user's choice will become the selected third-party device 430B. Once the user has made a choice for the selected third-party device 430B, the device row 431B will automatically update such that the device row 431B displays the plurality of device card elements associated with the selected third-party device 430B.

The secondary user device 405B allows for the secondary user to receive a selected card element 435B from the device row 431B to the user row 433B. The user does this through a tactile motion 436B. The tactile motion 436B can be one continuous swipe, flick, fling, or similar gesture. Alternatively, the tactile motion 436B can be a plurality of tapping motions.

Referring to FIGS. 4A and 4B, and as previously discussed, a user on a user device 405A can send a selected card element 435A from the user row 433A to the device row 431A. The device row 431A displays the device card elements associated with the selected third-party device 430A. By sending the selected card element 435A to the device row 431A, the selected card element 435A becomes associated with the selected third-party device 430A. When a secondary user on a secondary user device 405B chooses a selected third-party device 430B from the entity list 425B, that secondary user is able to see all the device card elements associated with the selected third-party device 430A. These device card elements are displayed on the device row 431B of the secondary user device 405B.

Therefore, if a user has sent a selected card element 435A to the device row 431A of a selected third-party device 430A, and the secondary user has selected the same third-party device 430B, such that 430A and 430B are the same third-party device, the secondary user is able to send the selected card element 435B from the device row 431B to the user row 433B, (where 435A and 435B are the same selected card element), such that the secondary user is able to view the selected card element 435A/435B on the user row 433B of the secondary user device 405B.

Figure 5:
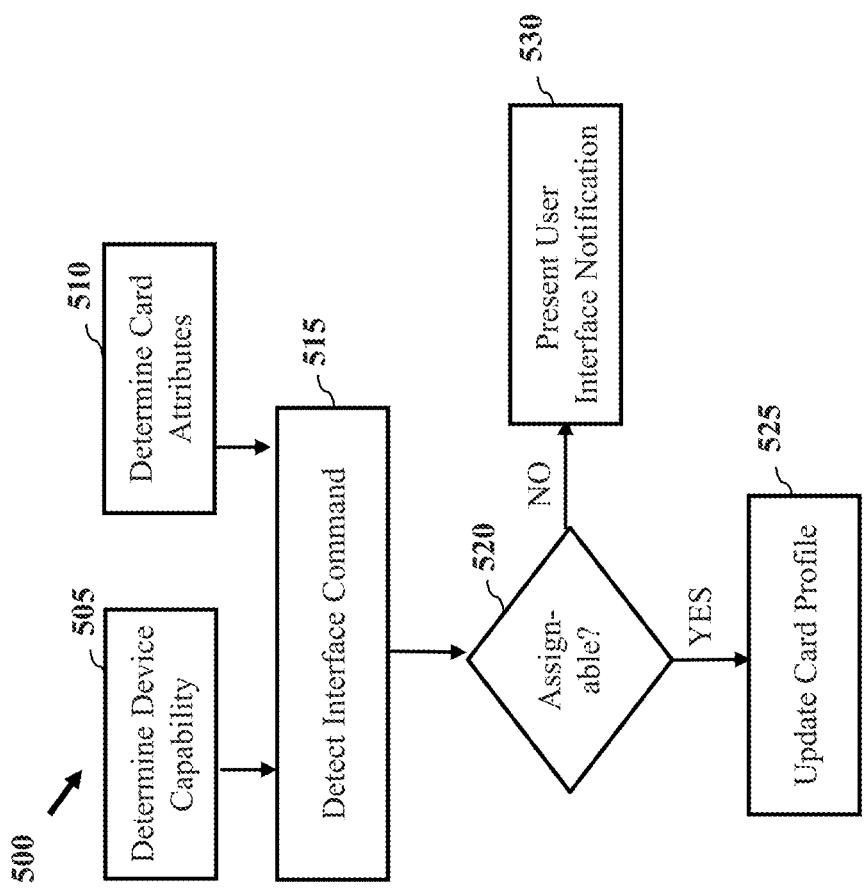
FIG. 5 depicts a process for card assignment according to one or more embodiments.

FIG. 5 depicts a process for card assignment to a device according to one or more embodiments. Process 500 may be employed by a device (e.g., device 105, device 155, etc.) according to one or more embodiments. Process 500 is associated with operations executed by a device and performed by an application, such as a MOX application, run by the device for displaying the user interface and interaction with one or more other devices. According to one embodiment, process 500 includes determining device capability at block 505 and determining card attributes at block 510. Determinations at block 505 and 510 may be performed by the device or a MOX application to pre-determine capabilities of devices, cards and user interface actions.

According to on embodiment, determining device capability at block 505 includes determining capabilities of a device that may be accessible or presented by a graphical element in the user interface. According to one embodiment, cards may be assignable to a device based on a capability matching of the card and the device. By way of example, the card type, or functionality, may allow for interoperation with one or more device functions. By way of further example, a device including display or media operations may be assigned a card associated with the display or media operations. In a similar fashion, a device configured for control (e.g., lighting, home automation, etc.) can be assigned a card directed to settings for the device, including display or media operations may be assigned a card associated with the display or media operations. The device capability may be based on a profile generated for the device within the MOX application. In certain embodiments, device profiles may be similar for similar types of devices. Determining device capability at block 505 may include processing stored information for devices accessible to the user interface device. Alternatively, or in combination, determining device capability at block 505 may include requesting device capability via the MOX application.

Determining card attributes at block 510 can include determining one or more of profile information, capabilities, functions, restrictions and card formatting according to one or more embodiments. At block 510, card attributes may be determined for cards displayed by the user interface, cards in queue for display, and cards that may be scrolled to by the user interface configuration. Card attributes determined may include supported device types, functionality associated with the cards, card limitations, etc. According to one embodiment, process 500 may determine device capability at block 505 and determine card attributes 510 contemporaneously and/or prior to interface commands are generated or applied to the user interface. Blocks 505 and 510 may be performed independently and separately of one another in certain embodiments. In certain embodiments, blocks 505 and 510 may be performed by process 500 based on display changes to the user interface, selection of a device, selection of a card and/or movement of a card.

Process 500 includes detecting an interface command at block 515. The interface command may relate to one or more commands within the user interface to assign a card to a device. In one embodiment, the interface command may include detection of a card assignment to a device. By way of example, the user interface may allow for a card to be selected (e.g., touch, etc.) at a first portion of the user interface (e.g., row 333) and dragged to a second portion of the user interface (e.g., row 331), the second portion relating to a graphical display for a device.

Based on the detected interface command, process 500 may include determining assignability at block 520. In one embodiment, cards may be assigned unless the card is restricted, incompatible, or already assigned to the selected device. According to one embodiment, determining if a card is assignable at block 520 may be determined by the MOX application during the interface command. In that fashion, the user interface can present one or more bumps or notifications (e.g., "NO" path out of decision block 520) to indicate that the card may not be assigned at block 530. Presenting user interface at block 530 may allow for the user of the MOX application to be notified that the selected card is not compatible for assignment.

Alternatively, the user interface may update the user interface and/or card profile (e.g., "YES" path out of decision block 520) to indicate that the card has been assigned.

When the card may be assigned, the MOX application can update the card profile at block 525. Updating a card profile at block 525 may include updating the card metadata stored by the MOX application to recognize the assignment of the card to a device.

Figure 6:
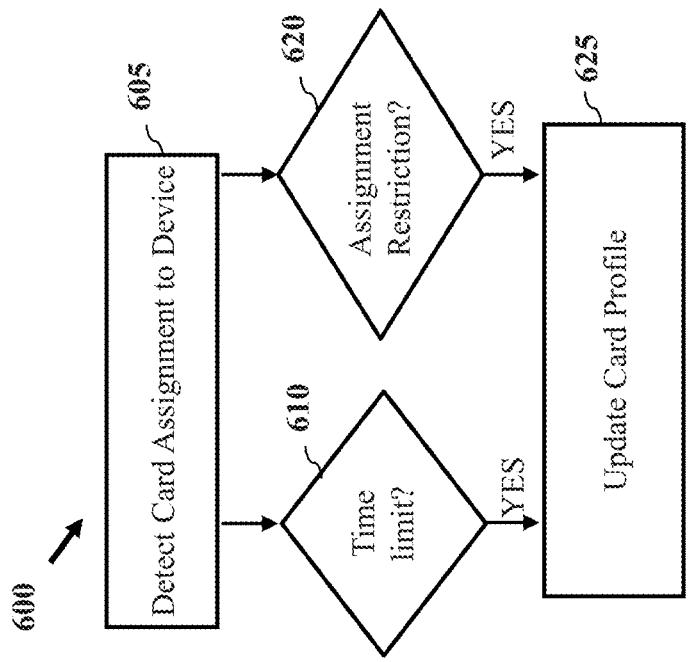
FIG. 6 depicts a process for card element assignment processing according to one or more embodiments.

FIG. 6 depicts a process for updating a card element based on an assignment of a card to a device according to one or more embodiments. Process 600 may be performed by the one or more devices supporting the MOX application, such as a MOX application residing (e.g., executed by) one or more end user devices and one or more servers.

Process 600 may be initiated by detecting a card assignment to a device at block 605. In one embodiment, detection of a card assignment to a device at block 605 may be based on a server receiving card profile and/or device profile data. A card assignment by a device may include detecting a user interface command for a card to a displayed graphical element of the user interface resulting in one or more of card metadata and device metadata to be updated by the MOX application. Detection at block 605 may be based on a card metadata change, receiving a transmission of card profile data, device data etc. According to certain embodiments, a MOX application on a device may generate periodic transmissions of one or more of card metadata and device profile information. A network device running MOX and/or the MOX application can determine if there are any limitations following a card assignment. By way of example, process 600 may include determining a time restriction limit at block 610 and/or determining a card restriction at block 620.

According to one embodiment, determining a time restriction limit at block 610 includes determining by the MOX application if the assignment includes a time period that the card is assignable or not assignable to the device. In certain embodiments, assignment can include detecting a time limit for the assignment of a card to a device such that a card is assignable to a device for a particular predetermined amount of time.

Determining a restriction at block 620 can include determining one or more capability restrictions for the card. In certain embodiments, determining a restriction at block 620 may include determining profile capabilities for the card and assigned device. When a card is not compatible with a device, the application may prevent assignment.

The card profile is updated at block 625 based on an assignment. An updated card profile can be sent to end user devices, servers etc., by the MOX application for determining card compatibility, presentation of the user interface, etc. Assignment of a card can include duplication or creation of a new card. Updated card profile can include duplicating the card.

Figure 7:
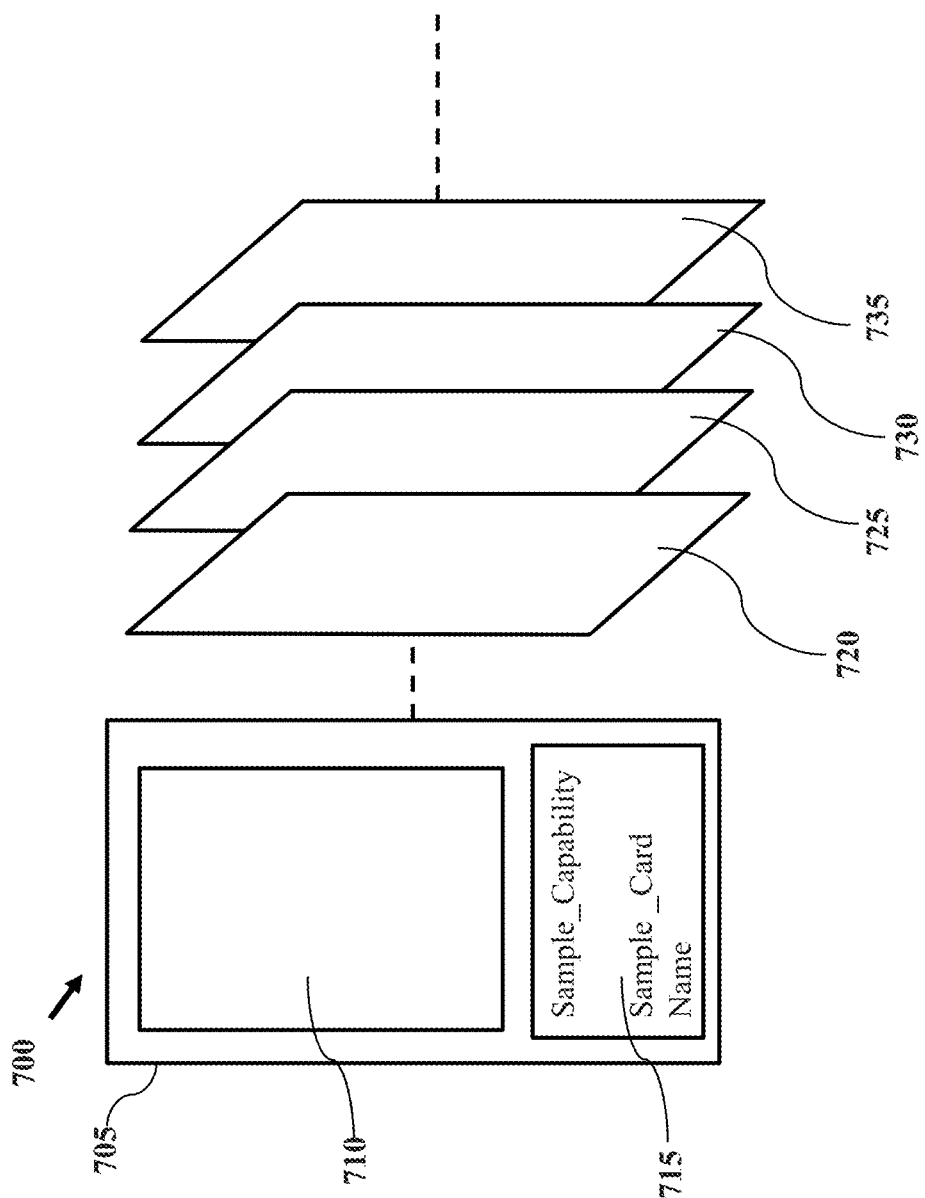
FIG. 7 depicts a graphical representation of card configuration according to one or more embodiments.

FIG. 7 depicts a graphical representation of card configuration according to one or more embodiments. Card element 700 may be a MOX card element. In certain embodiments, a MOX card itself is an HTML object, containing relevant resources related to color pallet, and branding, as well as the interactive components. Both the front and the back of the card are supplied by the device itself, and are validated by the cloud. Card element 700 may include several layers to allow for the card element to function and be used within an application where layers of the card have a different function. FIG. 7 depicts an exemplary representation of card element 700 as may be displayed. By way of example card element 700 may be displayed as graphical element 705 which includes image 710 and description 715. Image 710 may be specified by a user of the application or generated by the application. Image 710 may be employed to identify the card element. Description 715 may be user specified or similarly defined by the application. Description 715 may provide a name, type, and/or brief description of the card element 700 in text.

Presentation of card element 700 as graphical element 705 may employ interface layer 720 to define the graphical elements (e.g., image 710, description 715, etc.). Interface layer 720 may provide the user interface graphical elements that enables presentation but also reduce the amount of data to be processed (as opposed to the entire card) in order to present graphical elements for display of card element 700. HTML layer 725 can provide one or more web-based protocols or formatting. JavaScript layer 730 can include web-based elements can include but are not limited to CSS, JavaScript, and HTML5. Metadata layer 735 (e.g., JSON) can relate to metadata associated with the card that may define the card type, card content, card functionality, etc. According to one embodiment one or more layers of card element 700 may be pre-loaded for interoperation with a user interface of an application. It should be appreciated that card element 700 may include one or more additional or different layers.

According to one embodiment, presentation of card element 700 can introduce color into modular layout. Layout of the card element 700 may also be configured with a color pattern associated with cultural perspectives. According to another embodiment, the outer border of card element 700 may be presented to visually differentiate offerings and/or allude to potential movement of card element 700. Border edges of card element 700 can also manage the amount of information presented and include a contextual menu within the card footprint.

Card element 700 may be presented as a summary view and/or a detailed view. The summary view can include content associated with pre-loading of a protocol stack and interface layer 720. Summary view can include a brief description of content associated with the card element 700. In another embodiment, preloaded protocol stack can be used for displaying content associated with card element 700 for a detailed view within the application. A detailed view of card element 700, for example, can include a discussion of a card type, such as a web card, which is not displayed in the summary view. However, access to the detailed view of the card element may result in display of the discussion in at least a portion of the display of the card element as a detailed view. Web card functions may include one or more of generating a web card, embedding a web card from broadcasts to a MOX display, and commenting features.

According to one embodiment, card element 700 may be imported to an application. By way of example, elements displayed or presented in a native application can include MOX as a selection from a drop down menu so that elements/documents can be added to MOX. Following the selection, a template is selected, information is received regarding a description of the card element, privacy, tag, expiration, location (map) and comments and representative photo for creation of the card element 700 in one exemplary embodiment.

According to one embodiment, card element 700 may be configured as a card container configured to retain the metadata associated with a card. By way of example, card element 700 may contain the UUID values needed to track owner, creator, sender, instance, and card master. This metadata is associated with the card and validated by the cloud publishing services.

Card element 700 may be configured in a plurality of configurations to provide a plurality of card types. In addition to the card types discussed herein, card element 700 may be a combination of one or more card types discussed herein. Alternatively, and/or in combination, a card may be presented as a fusion of two cards together. By way of example, the fusion may relate to presentation of card element 700 with a portion of the display features relating to a first card, and a portion of the display features relating to a second card.

In one embodiment, card element 700 may be configured as a shortcut card configured to launch an application that is external to MOX application. By way of example, the MOX application may be ran on a device which presents a MOX user interface. The device executing the MOX application may include a native application (e.g., operating system, platform, etc.). Selection of a shortcut card element from the MOX user interface can prompt/initiate execution or startup of an application resident on the device or to be executed by the native application. In that fashion, the MOX application can interoperate, and/or at least initiate other programs from the MOX user interface.

In one embodiment, card element 700 may be configured as a content card. A content card may represent a document or file in the version of a card. As such, selection of the content card may launch presentation of the document. A content card can present a preview of the content with the card display format as well as include the entire data (e.g., PDF's, image, contacts, etc.). One type of content card may be an image card for image files, wherein the summary view provides a preview of one or more image files. When the content card relates to a file type, for example, a spreadsheet file, the presentation of the card element in the summary view may include an image of the particular file itself or a representation of the file type. One type of content card may be a web card. A web card can be created with an item of interest, such as an interest card, and can include image data in the summary view, and a brief description of the item. In a detailed view, the web card can include content (e.g., image of a webpage, etc.) and additional information associated with the item of interest. As an interest card, the web card can be viewed and account for the number of times viewed, shared, etc. The MOX can track number of check-ins, last time a card was viewed, and provide metrics for card access in the display of the card element, such as a detailed view.

In one embodiment, card element 700 may be configured as an interactive card to provide functionality with purpose built light interactions. By way of example, a list card may be an interactive card. The list card may be a listing of items (e.g., shopping, to-do list, checklist, etc.) which may be incorporated into a card element. The shopping list card can include a graphic list in the summary view and an intractable list in the detailed view. The list card function may include one or more of processes, systems and devices for providing, hanging and updating a list card. The list format is retained across devices and more than just text can be shared.

A widget card can provide a unique functionality that is purpose built for more intensive features such as control of a device (e.g., thermostat, TV, media player, etc.) with interactive controls based on or tailored to the particular device for control. By way of example, card element 700 may be a settings card including settings for a particular device that can be controlled using the user interface to control a device. The settings card may be associated with capabilities of a device. For example, a card may be associated with picture settings for a TV, media downloaded for the TV, a remote control for the TV, etc. The settings card operation may include one or more of processes, systems and devices for using a settings card. Settings cards may be applied to a display device, internet of things (IoT) devices, and may be profiled based on preferences.

In another embodiment, card element 700 may be a now playing card, associated with media, music or video including the name of the media playing and additional information to be displayed with a card. The now playing card may be presented during playback of media and may be removed from the display once playback has stopped. In another embodiment, card element 700 may be configured as a door bell card that allows for selection of the card to alert another user of MOX that is associated with the card.

In one embodiment, card element 700 may be configured as a gaming card. Gamification of card elements, such as a "you're it" card, card can be sent to "tag" a user. The tag functionally may display to a user in the user interface that they have been tagged and include a message from the sender. Gamification can include a point system based on access to the MOX application wherein points are collected and tallied by the MOX application based on usage. The points may be used for purchases, such as other cards, and/or for rewards. In one embodiment, MOX may provide a social feed card. The operation may include one or more of processes, systems and devices for presenting portions of a social media account within a MOX user interface.

In one embodiment, card element 700 may be configured as a challenge card. The challenge card can include a description of the challenge, and may include a timer. Based on access to the card, a user can accept the challenge to complete.

In one embodiment, card element 700 may be configured for payment and/or transactions. Card elements may be configured for payment, rewards clubs, banking, transit costs, etc. The payment card operation may include one or more of processes, systems and devices for providing payments via card and associating a card with payment, identity, etc.

In one embodiment, card element 700 may be a single use card. Single use cards may include one or more of processes, systems and devices for exchanging a singe use card. Single use cards may include formatting of card to provide a single use and use with card purchasing (e.g., gift cards, stationary, etc.).

In one embodiment, card element 700 may be configured to provide mirror control. The operation may include one or more of processes for providing mirror image of MOX interface onto another device, embedding a card from broadcasts to MOX display and interacting with a store.

In one embodiment, card element 700 may be configured as a novelty card. A novelty card may be an image card, such as a trading card. The novelty cards can be associated with sports paraphernalia. Novelty cards can be created for family members. Novelty card may be a sports card with an image and text associated with the individual or subject of the image. As such, card element 700 may used to encapsulate a picture, sports team, year, number and images or video. Novelty cards or other cards can be personalized with graphical elements or stickers associated with points of interest, such as organizations, professional sports teams, etc. The badge may be a card associated with connections to a particular item of interest.

In one embodiment, card element 700 may be configured as a warranty card. The warranty card may be created to provide warranty information for a device. The warranty card may be a particular format, such as pdf. A summary view of the warranty card can provide image of the product, a name, and card type. A detailed viewed can provide device particulars such as product model, size, capabilities, warranty terms, file information and comments.

In one embodiment, card element 700 may be video link card to provide notice of chat available. A video link card may be sent in MOX to allow or initiate connection, such as video feed or chat, between two or more devices.

In one embodiment, card element 700 may be personal tracker card for tracking locations of a user. The tracking card can include map displays to show locations of the user, places the user has visited, and the location of one or more other entities in MOX. Regarding goal tracking, such as health tracking, can be tied to a wearable device to track activity, calories burned, distance or other goals. The user interface can present a graphic, in either the card summary or detailed view, providing a display of progress toward a goal, the current level, the goal amount and performance metrics in general.

In one embodiment, card element 700 may be a greetings card. Card element 700 may relate to a one time use or single instance card which can be created or purchased as greetings cards (e.g., birthday, sympathy, congratulatory, etc.). Similarly, card element 700 may be a goodness card that includes a message than can be sent to deliver positive messages/goodwill. The goodness card may be tracked to see how may user open, send, received, etc. By tracking the goodness card, the user interface can present a map or graphic illustrating the reach of the goodness card. Card element 700 may be a birthday card, graphic message including name of recipient, etc. In certain embodiments, card element 700 may be associated with a greetings card pack, or collection of multiple card elements.

In one embodiment, card element 700 may be configured to provide connectivity to a device or network, such as WI-FI, home network access. The card can include credentials for access to the network in residential or public spaces.

In one embodiment, card element 700 may be contact card. The contact card can include an image for the contact, contact information, company name, etc. Card element 700 may be used as digital note passing including a user photograph and message, and a description of the note. As such, card element 700 can be used for chatting, sending a questions and conversations. Text messages of card element 700 can include a quotation, author of the quote, and source information associated with the note. In one embodiment, card element 700 may be schedule card including an image or text message for task to be completed and the due date for the task. Card element 700 may include location information including an address and map data associated with the location.

According to another embodiment, card element 700 may be a social card associated with one or more social media applications. The social card can relate to a micro-application for providing a social media account or accounts within the MOX user interface. In other embodiments, card element 700 can encapsulate a function or features of a social media account such as a message, image, status, etc.

In one embodiment, card element 700 may include advertisements incorporated into presentation of a card, such as a coupon or product placement.

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

Although several features and embodiments are discussed relative to a MOX application, it should be appreciated that principles and teachings of the disclosure are not limited to MOX applications.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims While this disclosure has been particularly shown and described with references to exemplary embodiments thereof, it will be understood by those skilled in the art that various changes in form and details may be made therein without departing from the scope of the claimed embodiments.

What is claimed is:

1. A method for assigning card elements of an application user interface to a device, the method comprising:
   presenting, by a device, a user interface, wherein the user interface is presented including graphical elements for one or more card elements in a user row, and wherein the user interface is presented including graphical elements for one or more devices in a device row, wherein cards are presented based on a space that the device is located;
   detecting, by the device, a user interface command to associate a selected card element presented by the user interface with a selected device presented by the user interface, the selected device in proximity to the device and the selected device associated with the space, wherein the user interface command includes selection and movement of a graphical element for the selected card from the user row of the user interface to the device row associated with display of the selected space;
   detecting, by the device, a time limit for assignment of the selected card element to the selected device, such that the selected card is assigned to the selected device for a particular predetermined amount of time; and
   outputting, by the device, a communication including an association of the selected card element with the selected device, wherein the association of the selected card with the selected device includes updating metadata stored by the application for the card element to recognize the assignment of the card element to the selected device, wherein the communication includes an updated card profile for the selected card element to the selected device based on the assignment, and wherein assignment of the card element is a copy of the selected card element to a the selected device for the particular predetermined amount of time.

2. The method of claim 1, wherein the user interface includes the graphical elements for one or more devices in a first portion of the user interface and graphical elements for the one or more card elements in a second portion of the user interface.

3. The method of claim 1, wherein each card element includes graphical display elements in the user interface configured to be manipulated within the user interface to allow for at least one of exchange of data, capabilities, and device control.

4. The method of claim 1, wherein the user interface command includes selection and movement of a graphical element for the selected card from a first position in user interface to a second position associated with display of the selected device.

5. The method of claim 1, wherein association of the selected card element with the selected device includes providing connectivity to network including credentials for access to the network.

6. The method of claim 1, association of the selected card element with the selected device includes providing a personal tracker card for tracking locations of a user, including map displays to show locations of the user, places the user has visited, and the location of one or more other entities.

7. The method of claim 1, wherein association of the card element includes transmission of card element metadata to the device.

8. The method of claim 1, wherein updating metadata includes storing a unique identifier of the device with the card element metadata.

9. The method of claim 1, further comprising determining that assignment of the selected card element to the selected device conforms to at least one of capabilities of the device and card element constraints.

10. The method of claim 1, wherein the user interface continues to display the selected card element in the user interface following assignment to the selected device.

11. A device comprising:
    a display configured to present a user interface; and
    a controller coupled to the display wherein the controller is configured to
      present a user interface, wherein the user interface is presented including graphical elements for one or more card elements in a user row, and wherein the user interface is presented including graphical elements for one or more devices in a device row, wherein cards are presented based on a space the device is located;
      detect a user interface command to associate a selected card element presented by the user interface with a selected device presented by the user interface, the selected device in proximity to the device and the selected device associated with the space, wherein the user interface command includes selection and movement of a graphical element for the selected card from the user row of the user interface to the device row associated with display of the selected space;
      detect a time limit for assignment of the selected card element to the selected device, such that the selected card is assigned to the selected device for a particular predetermined amount of time;
      output a communication including an association of the selected card element with the selected device, wherein the association of the selected card with the selected device includes updating metadata stored by the application for the card element to recognize the assignment of the card element to the selected device, wherein the communication includes an updated card profile for the selected card element to the selected device based on the assignment, and wherein assignment of the card element is a copy of the selected card element to the selected device for the particular predetermined amount of time.

12. The device of claim 11, wherein the user interface includes the graphical elements for the one or more devices in one portion of the user interface and the graphical elements for the one or more card elements in a second portion of the user interface.

13. The device of claim 11, wherein each card element includes graphical display elements in the user interface configured to be manipulated within the user interface to allow for at least one of exchange of data, capabilities, and device control.

14. The device of claim 11, wherein the user interface command includes selection and movement of a graphical element for the selected card from a first position in user interface to a second position associated with display of the selected device.

15. The device of claim 11, wherein association of the selected card element with the selected device includes providing connectivity to network including credentials for access to the network.

16. The device of claim 11, association of the selected card element with the selected device includes providing a personal tracker card for tracking locations of a user, including map displays to show locations of the user, places the user has visited, and the location of one or more other entities.

17. The device of claim 11, wherein association of the card element includes transmission of card element metadata to the device.

18. The device of claim 11, wherein updating metadata includes storing a unique identifier of the device with the card element metadata.

19. The device of claim 11, wherein the controller is further configured to determine that assignment of the selected card element to the selected device conforms to at least one of capabilities of the device and card element constraints.

20. The device of claim 11, wherein the user interface continues to display the selected card element in the user interface following assignment to the selected device.

21. A system comprising:
a server; and
a device configured to communicate with the server, wherein the device is configured to
  present a user interface including graphical elements for one or more card elements in a user row, and wherein the user interface is presented including graphical elements for one or more devices in a device row, wherein cards are presented based on a space that the device is located;
  detect a user interface command to associate a selected card element presented by the user interface with a selected device presented by the user interface, the selected device in proximity to the device and the selected device associated with the space, wherein the user interface command includes selection and movement of a graphical element for the selected card from the user row of the user interface to the device row associated with display of the selected space;
  detect a time limit for assignment of the selected card element to the selected device, such that the selected card is assigned to the selected device for a particular predetermined amount of time; and
output a communication to the server including an association of the selected card element with the selected device, wherein the association of the selected card with the selected device includes updating metadata stored by the application for the card element to recognize the assignment of the card element to the selected device, wherein the communication includes an updated card profile for the selected card element to the selected device based on the assignment, and wherein assignment of the card element is a copy of the selected card element to a the selected device for the particular predetermined amount of time.

* * * * *